P. Z. McDONALD.
EYEGLASSES.
APPLICATION FILED FEB. 17, 1909.

998,626.

Patented July 25, 1911.

Witnesses
Walter B. Payne
H. H. Simms

Inventor
Percy Z. McDonald
By Church & Rich
His Attorneys

UNITED STATES PATENT OFFICE.

PERCY Z. McDONALD, OF CHICAGO, ILLINOIS, ASSIGNOR TO E. KIRSTEIN SONS' COMPANY, OF ROCHESTER, NEW YORK, A CORPORATION OF NEW YORK.

EYEGLASSES.

998,626.  Specification of Letters Patent.  Patented July 25, 1911.

Application filed February 17, 1909. Serial No. 478,349.

*To all whom it may concern:*

Be it known that I, PERCY Z. MCDONALD, of Chicago, in the county of Cook and State of Illinois, have invented certain new and useful Improvements in Eyeglasses; and I do hereby declare the following to be a full, clear, and exact description of the same, reference being had to the accompanying drawings, forming a part of this specification, and to the reference-numerals marked thereon.

The present invention relates to eyeglass mountings and more particularly to the type in which the guards are pivotally mounted on a substantially rigid support which connects the lenses, and an object of the invention is to provide a construction in which the parts may be reduced to a minimum size in order to render the mounting inconspicuous and to secure a small pupillary distance between the lenses.

To this and other ends the invention consists in certain improvements and combinations of parts all as will be hereinafter more fully described, the novel features being pointed out in the claims at the end of the specification.

Figure 1:
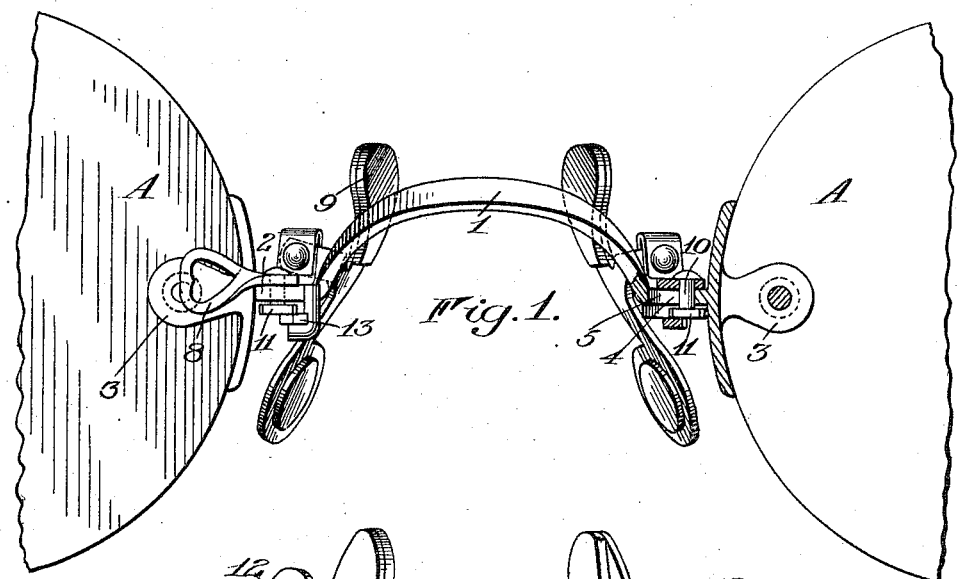
Figure 2:
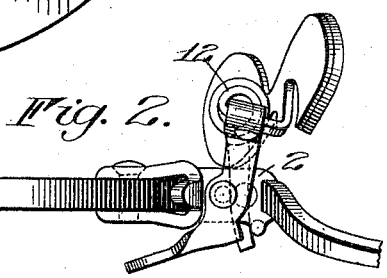
Figure 3:
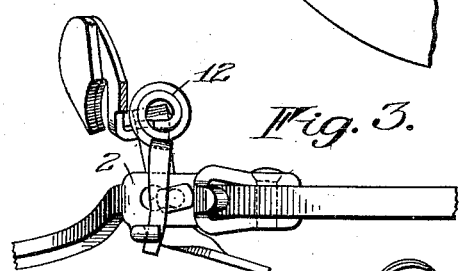
Figure 4:
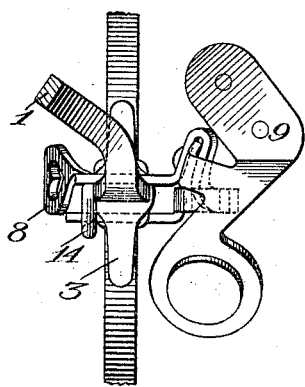
Figures 5, 8:
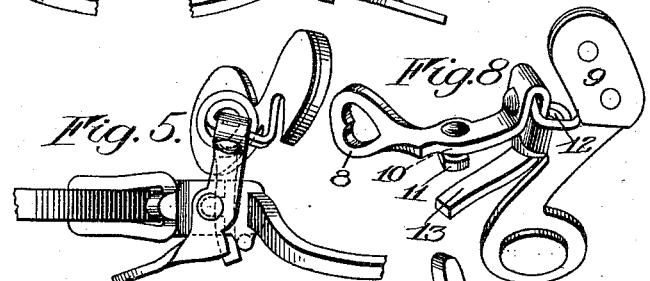
Figures 6, 7:
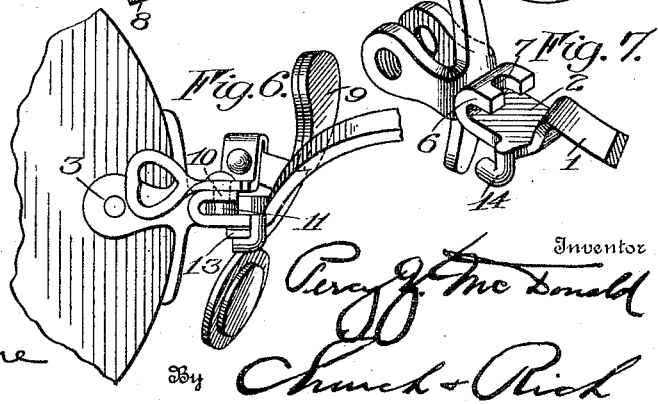

In the drawings: Figure 1 is an enlarged front view of one embodiment of the mounting partly in section, the lenses being partly broken away; Fig. 2 is an enlarged detail plan view of a portion of the same embodiment of the mounting in proximity to one of the nose guards; Fig. 3 is an enlarged detail bottom view of the same embodiment in proximity to one of the nose guards; Fig. 4 is an enlarged vertical section of the same embodiment; Fig. 5 is an enlarged detail plan view similar to Fig. 2 of another embodiment; Fig. 6 is an enlarged detail front view of the latter embodiment; Fig. 7 is a detail perspective view of the embodiment illustrated in Figs. 5 and 6; and Fig. 8 is a detail perspective view of one of the nose guards which is adapted for use with both embodiments of the support.

Referring more particularly to the drawings A indicates the lenses which may be connected by a substantially rigid support comprising in this instance a bridging portion 1 having horizontal portions 2 at its ends lying, in this instance, in the plane of the lenses and connected to the lens attaching devices 3.

The support is preferably provided with laterally opening bearings each of which may be formed by a vertical perforation 4 in the horizontal portion 2 and a larger perforation 5 communicating therewith, the walls of the smaller perforations serving as a bearing for a headed pivot pin, as will be described, and the larger perforation permitting the withdrawal of the head of the pivot. Instead of the bearing above described and illustrated in Figs. 1 to 4 there may be provided arms 6 which may project inwardly from the lens attaching devices 3 preferably in the plane of the lenses and above the horizontal portion 2, and may be formed by doubling the metal piece of which the horizontal portions 2 and the bridging portion 1 are made. The ends of the arms preferably do not extend to the bridging portion and are provided with bearings 7 opening laterally toward the bridge.

The nose guards may be in the form of levers extending forwardly and rearwardly from the support and movable substantially in a horizontal plane. The forward end 8 of each lever serves as a finger piece by which the guard is operated and the rear end carries the nose bearing portion 9. Preferably permanently carried by each guard is a pivot pin 10 which in this instance depends from the lever to coöperate with the bearing on the support, a movement of the pivot in the direction of its axis being prevented by a head 11 which may be elongated so that it may be fitted easily to its bearing on the support and will at the same time provide shoulders of sufficient size to prevent an axial movement. In fitting a guard to the form of support shown in Fig. 1 the head 11 thereon is introduced in an opening 5 by slightly tilting the guard sidewise, and after the head passes entirely through the opening, the pivot portion is moved into the bearing 4. In the form shown in Figs. 5 to 7 the head is introduced between the end of an arm 6 and the bridging portion 1, the pivot pin being afterwards carried into the bearing 7.

The coöperating bearings of the support and the guards may be held in engagement by springs which also serve to position the guards. These springs, in this instance, are in the form of vertical coils 12 suspended from the rear ends of the lever and having arms 13 extending forwardly and coöperating with the support, the latter preferably having depending hooks 14 against which the arms bear in a direction to hold the bearings of the guards in engagement with the bearings of the support.

It is apparent that in order to remove the guards from the support to repair them or for fitting the mounting to the nose of a wearer, the arms 13 are disengaged with the hooks 14 and the bearings of the guards are separated from those of the support by a movement of the guards laterally or, in this instance, toward the bridging portion. The attachment of the guards is, of course, effected by a reversal of these operations. To apply the mounting to or remove it from the nose the finger pieces are pressed together and then released permitting their rear ends to move toward each other under the action of the springs.

Eyeglasses constructed in accordance with this invention may be made with a very short pupillary distance. This is due to the fact that the laterally opening bearing is formed in the support instead of the guard and as a consequence the latter may be made of a width no greater than the width of the pivot pin, whereas when the laterally opening bearing is in the guard it must be made as great as the width of the pin plus the metal which is necessary to unite these portions of the guard on opposite sides of the bearing opening. Another advantage of this construction is that a wider bearing surface is secured by providing the pivots on the guard levers instead of the support because the guard levers are preferably made of very thin material to render the mounting inconspicuous and lessen the cost of manufacture, and the support must be made of heavier stock to rigidly connect the lenses. This wider bearing surface prevents the guard wabbling and the guards are further supported against this action by the construction shown in Figs. 5 to 7 where the headed end of the pivots bears against the support.

I claim as my invention.

1. In an eyeglass mounting, the combination with a support having a bridging portion, lens attaching devices, horizontal portions in the plane of the lens attaching devices connecting the latter to the bridging portion, and bearings beyond the ends of the bridging portion and in the plane of the lens attaching devices, opening laterally toward the bridging portion, of nose guards each carrying a pivot coöperating with a laterally opening bearing, and springs for positioning the guards acting in directions to retain the pivots in engagement with the laterally opening bearings.

2. In eyeglass mountings, the combination with a support embodying a bridging portion, lens attaching devices connected to the bridging portion, and arms extending inwardly from the lens attaching devices having laterally opening bearings, of nose guards each having a pivot thereon coöperating with one of the laterally opening bearings, and springs for positioning the guards acting on the latter in directions to retain the pivots in engagement with the laterally opening bearings.

3. In eyeglass mountings, the combination with a support embodying a bridging portion, horizontal portions at the ends of the bridging portions, arranged in the plane of the lenses, lens attaching devices to which the horizontal portions are secured, and arms extending inwardly in the plane of the lenses and said horizontal portions, of nose guards, and a pivotal connection between each nose guard and an arm embodying a pivot pin permanently secured to one of said parts and bearing in the other.

4. In eyeglass mountings, the combination with a support embodying a bridging portion, horizontal portions at the ends of the bridging portion, arranged in the plane of the lenses, lens attaching devices to which the horizontal portions are secured, and arms extending inwardly in the plane of the lenses and above the horizontal portions, having laterally opening bearings, of nose guards carrying pivot pins turning in the laterally opening bearings, and springs for positioning the guards acting on the latter in directions to retain the pivot pins in engagement with the laterally opening bearings.

5. In eyeglass mountings, the combination with a support embodying a bridging portion, horizontal portions at the ends of the bridging portion arranged in the plane of the lenses, lens attaching devices to which the horizontal portions are secured, and arms extending inwardly in the plane of the lenses, of nose guards carrying pivot pins with heads at their free ends, said pins coöperating with the laterally opening bearings and having their heads lying between the horizontal portions and the bearing arms, and springs for positioning the guards acting on the latter in a direction to retain the pivot pins in the bearings of the arms.

PERCY Z. McDONALD.

Witnesses:
JULIUS G. APPELT,
FRANK E. WAUGH.

Copies of this patent may be obtained for five cents each, by addressing the "Commissioner of Patents, Washington, D. C."